United States Patent
Clark et al.

(10) Patent No.: US 10,166,947 B2
(45) Date of Patent: Jan. 1, 2019

(54) SEALED WEB RETRACTORS FOR PERSONAL RESTRAINT SYSTEMS AND ASSOCIATED SYSTEMS AND METHODS

(71) Applicant: Shield Restraint Systems, Inc., Elkhart, IN (US)

(72) Inventors: John Clark, Granger, IN (US); Brandon S. Marriott, Goshen, IN (US); Brian Babin, Bristol, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 283 days.

(21) Appl. No.: 15/226,497

(22) Filed: Aug. 2, 2016

(65) Prior Publication Data
US 2017/0106832 A1   Apr. 20, 2017

Related U.S. Application Data

(60) Provisional application No. 62/241,762, filed on Oct. 15, 2015.

(51) Int. Cl.
*B60R 22/405*   (2006.01)
*B60R 22/34*   (2006.01)

(52) U.S. Cl.
CPC .... *B60R 22/405* (2013.01); *B60R 2022/3402* (2013.01)

(58) Field of Classification Search
CPC .......... B60R 22/405; B60R 2022/3402; B60R 22/36
See application file for complete search history.

(56) References Cited

U.S. PATENT DOCUMENTS

| | | | |
|---|---|---|---|
| 4,168,810 A | 9/1979 | Sack et al. | |
| 5,209,421 A * | 5/1993 | Fujiwara | B60R 22/34 242/379 |
| 5,624,086 A | 4/1997 | Snyder et al. | |
| 6,419,178 B1 * | 7/2002 | Kohlndorfer | B60R 22/34 242/379.1 |
| 9,150,190 B2 * | 10/2015 | Jessup | B60R 22/34 |
| 9,266,497 B2 * | 2/2016 | Jessup | B60R 22/34 |
| 2002/0035878 A1 | 3/2002 | Norton | |
| 2013/0327874 A1 | 12/2013 | Jessup et al. | |
| 2014/0054405 A1 | 2/2014 | Clark et al. | |

OTHER PUBLICATIONS

International Search Report and Written Opinion dated Jan. 12, 2017; International Application No. PCT/US2016/056574; 10 pages.

* cited by examiner

*Primary Examiner* — Sang K Kim
(74) *Attorney, Agent, or Firm* — Perkins Coie LLP (57) ABSTRACT

Sealed web retractors and associated systems and methods for retracting a web, such as seat belt web, are disclosed herein. In one embodiment, a web retractor includes a frame having a sidewall with a first opening, a locking assembly attached to the frame and having a housing with a second opening adjacent to the first opening, and a shaft coupler rotatably and sealably carried by the sidewall. The shaft coupler operably couples a spool shaft to the locking assembly through the first and second openings. At least one seal is operably positioned in the first opening between the shaft coupler and the sidewall.

20 Claims, 8 Drawing Sheets

SEALED WEB RETRACTORS FOR PERSONAL RESTRAINT SYSTEMS AND ASSOCIATED SYSTEMS AND METHODS

CROSS-REFERENCE TO RELATED APPLICATION

The present application claims priority to U.S. Provisional Application No. 62/241,762, filed Oct. 15, 2015 and titled "Sealed Web Retractors for Personal Restraint Systems and Associated Systems and Methods, which is incorporated herein by reference in its entirety.

TECHNICAL FIELD

The following disclosure relates generally to seat belt web retractors and associated systems and methods.

BACKGROUND

Seat belt systems are used to restrain passengers in automobiles, aircraft, recreational utility vehicles (RUVs), and other vehicles in the event of a crash or other potentially dangerous event. In automobiles, seat belt systems typically include a belt or web that can be pulled from a web retractor fixedly attached to a mounting structure on one side of a vehicle seat. The web can be extended across the occupant's body, and the free end of the web, which typically carries a connector tongue, can be releasably engaged with a buckle anchored to the base of the seat or the floor opposite the web retractor. Conventional web retractors typically include a spring-loaded spool that maintains tension on the web and retracts the web when it is not in use.

BRIEF DESCRIPTION OF THE DRAWINGS

FIG. 2A is a side view.

DETAILED DESCRIPTION

The following disclosure describes sealed web retractors and associated systems and methods for retracting a web, such as a seat belt web. In some embodiments, a sealed web retractor configured in accordance with the present technology includes a frame having a sidewall with a first opening, a locking assembly attached to the frame and having a housing with a second opening adjacent to the first opening, and a shaft coupler rotatably and sealably carried by the sidewall. The shaft coupler operably couples a spool shaft to the locking assembly through the first and second openings. At least one seal is operably positioned in the first opening between the shaft coupler and the sidewall. In operation, the shaft coupler and the seal restrict the ingress of moisture, fluids, and other debris into the first and second openings. This, in turn, prevents moisture, fluids, and debris from interfering with and/or fouling the locking components within the locking assembly.

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the description of any particular element, the most significant digit or digits of any reference number refer to the Figure in which that element is first introduced. For example, element 120 is first introduced and described with reference to FIG. 1.

Figure 1A:
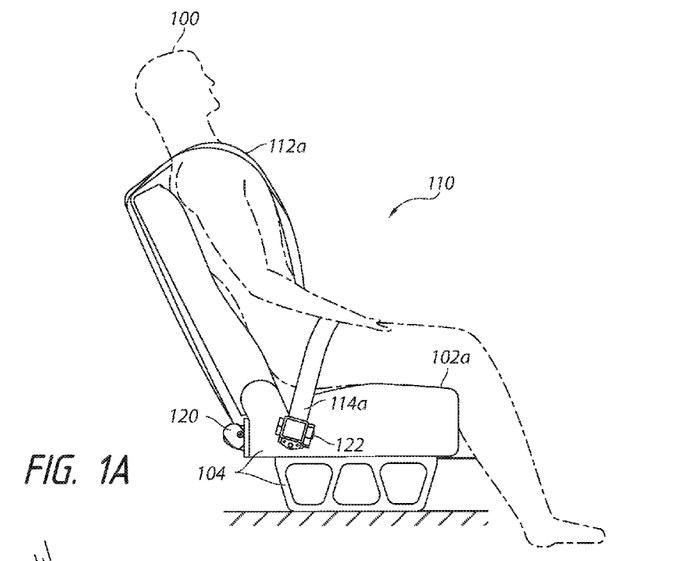
FIG. 1A is a side view of an occupant seated in a vehicle having a restraint system with web retractors configured in accordance with an embodiment of the present technology.

FIG. 1A is a side view of an occupant 100 secured to a vehicle seat 102*a* with a restraint system 110 having a first web retractor 120 configured in accordance with an embodiment of the present technology. The restraint system 110 can be a seat belt system used to secure the occupant 100 in, for example, ground vehicles (e.g., RUVs automobiles, trucks, off-road vehicles), water vehicles (e.g., boats, ships, jet skis), aircraft (e.g., private and military aircraft), spacecraft, etc. The first web retractor 120 can be fixedly attached to a rear portion of seat frame 104 by means of bolts and/or other suitable fasteners known in the art, and can include a spring-loaded spool (not shown in FIG. 1A) that carries a shoulder web 112*a* wound thereon.

In the illustrated embodiment, the restraint system 110 also includes a lap web 114*a* that can be carried by and deployed from a second web retractor 122 anchored to the seat frame 104. The second web retractor 122 can be the same as, or at least substantially similar in structure and function as the first web retractor 120. The shoulder web 112*a* and the lap web 114*a* can be conventional seat belt webs made from woven materials (e.g., nylon) known in the art. In certain embodiments, the webs 112*a* and 114*a* can be used in a conventional manner, such as extracting the shoulder web 112*a* and the lap web 114*a* from the corresponding retractors 120 and 122 and releasably engaging connectors (not shown) carried by the distal end portions of the webs 112*a* and 114*a* into a single buckle (not shown) or separate buckles (not shown) that can be anchored to the seat frame 104 or the floor of the vehicle (e.g., on the opposite side of the seat 102*a* from the second web retractor 122).

Figure 1B:
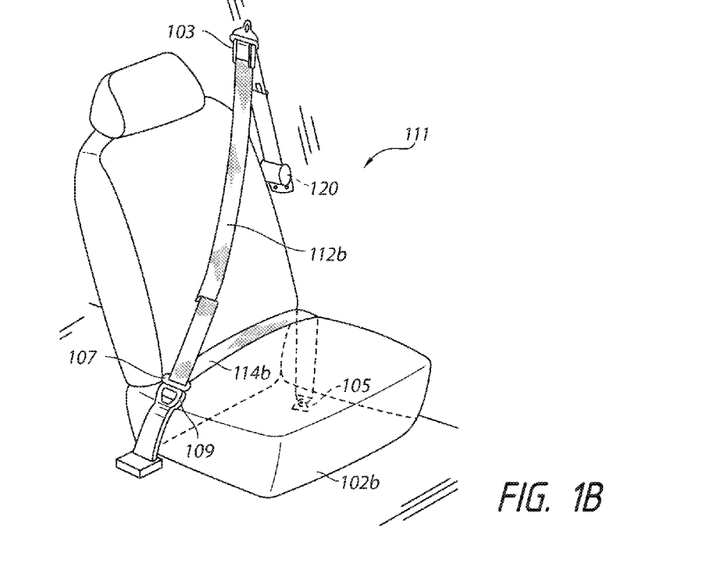
FIG. 1B is an isometric view of another restraint system that includes one of the web retractors.

FIG. 1B is an isometric view of a restraint system 111 configured in accordance with another embodiment of the present technology. The restraint system 111 includes features that are at least generally similar in structure and/or function to the restraint system 110 discussed above. The restraint system 111, for example, includes a seat 102*b*, a shoulder web 112*b*, a lap web 114*b*, and the web retractor 120. In the illustrated embodiment, however, the web retractor 120 is fixedly attached to a sidewall portion of the vehicle. The shoulder web 112*b* slideably passes through a guide 103 (e.g., a D-ring) before extending downward into the web retractor 120. The lap web 114b is fixedly attached to an anchor 105 on a floor of the vehicle adjacent to the seat 102b. A belt connector 107 can be slideably coupled to the shoulder web 112b and the lap web 114b. The belt connector 107 releaseably engages a buckle 109 anchored to the floor of the vehicle opposite the anchor 105. The vehicle-mounted retractor 120, like the seat-mounted retractors described above, can facilitate extension, retraction, and locking of the shoulder web 112b and the lap web 114b. In further embodiments, the retractors 120 and 122 can be mounted directly to the sidewall of the vehicle, to other portions of the vehicle (e.g., the vehicle floor), and/or to other equipment within the vehicle (e.g., a car seat).

Although FIGS. 1A and 1B illustrate two possible configurations of seat belt systems, those of ordinary skill in the art will appreciate that the web retractors disclosed herein can be suitably employed in a wide variety of seat belt systems and vehicles with which seat belt web retractors are used. In other embodiments, for example, the restraint systems 110 and 111 can include additional webs (e.g., additional shoulder webs, crotch webs) and corresponding retractors. Accordingly, those of skill in the art will understand that the web retractors described herein are not limited to use in any particular configuration or arrangement.

Figure 2A:
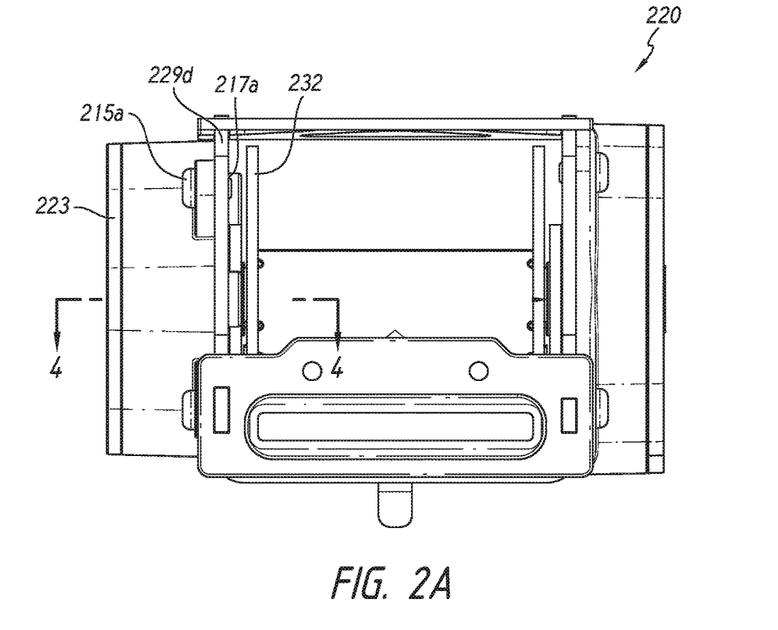
Figure 2B:
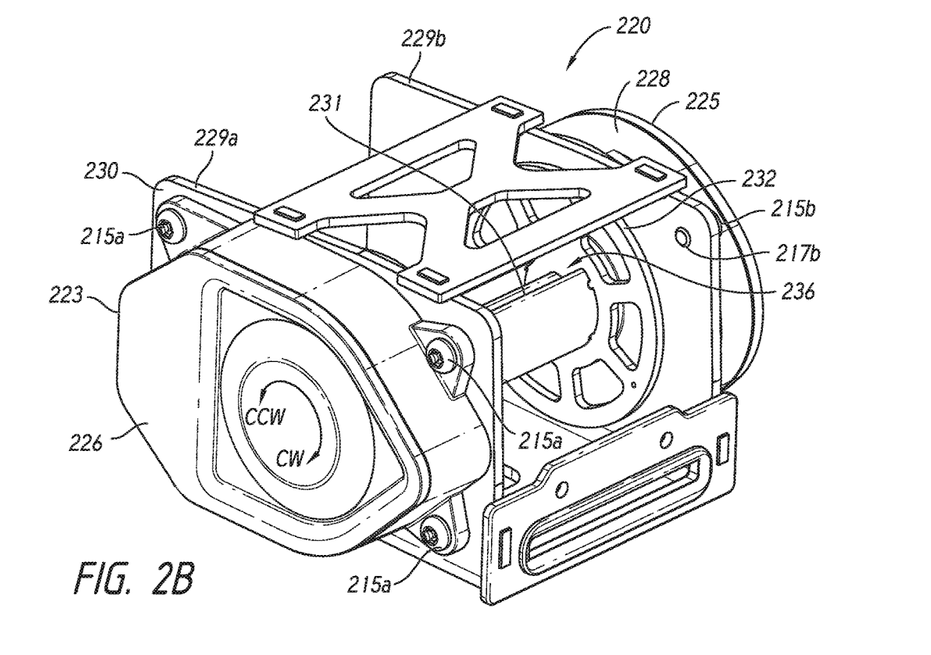
FIG. 2B is a front isometric view of a web retractor configured in accordance with an embodiment of the present technology.

FIG. 2A is a front view, and FIG. 2B is a top isometric view of the web retractor 220 configured in accordance with an embodiment of the present technology. Referring to FIG. 2B, the web retractor 220 includes a locking mechanism assembly 223 ("locking assembly 223") and a spring drive assembly 225 ("drive assembly 225") mounted to opposing sidewalls 229 (identified individually as a first frame sidewall 229a and a second frame sidewall 229b) of a retractor housing or frame 230. The locking assembly 223 and the drive assembly 225 can be attached to the corresponding sidewalls 229 of the retractor frame 230 using fasteners (e.g., screws, such as pan-head screws), mating interfaces, and/or other suitable attachment means known in the art. In the illustrated embodiment, for example, the locking assembly 223 is attached to the retractor frame 230 by first fasteners 215a that engage corresponding threaded through-holes 217a (FIG. 2A) in the first frame sidewall 229a, and the drive assembly 225 is attached to the retractor frame 230 by second fasteners 215b that engage corresponding threaded through-holes 217b in the second frame sidewall 229b.

A rotatable spool assembly 232 ("spool 232") having a spring-loaded shaft 231 ("spool shaft 231") extends between the sidewalls 229 of the retractor frame 230. A first end portion of the spool shaft 231 is operably coupled to locking components (not visible in FIG. 2B) positioned within a housing 226 of the locking assembly 223. A second end portion of the spool shaft 231 is operably coupled to a spring (not visible in FIG. 2B) positioned within a housing 228 of the drive assembly 225. The spool 232 and the spool shaft 231 can be made from metal and/or other suitable materials known in the art.

The spool 232 further includes an opening or slot 236 that receives an end portion of the web (not shown) to secure the web to the spool 232 with internal engagement features (not shown). In other embodiments, the web retractor 220 can include other features known in the art to fasten the web to the spool 232. The web can be wound onto the spool 232 in a clockwise direction CW (FIG. 2B), and in other embodiments the web can be wound onto the spool 232 in the counterclockwise direction CCW. The web retractor 220 can be configured to hold webs having various lengths. The web retractor 220, for example, can be configured to hold webs having lengths from approximately 60 inches to approximately 100 inches, such as about 80 inches (for, e.g., a 1.2 mm thick web).

Figure 3A:
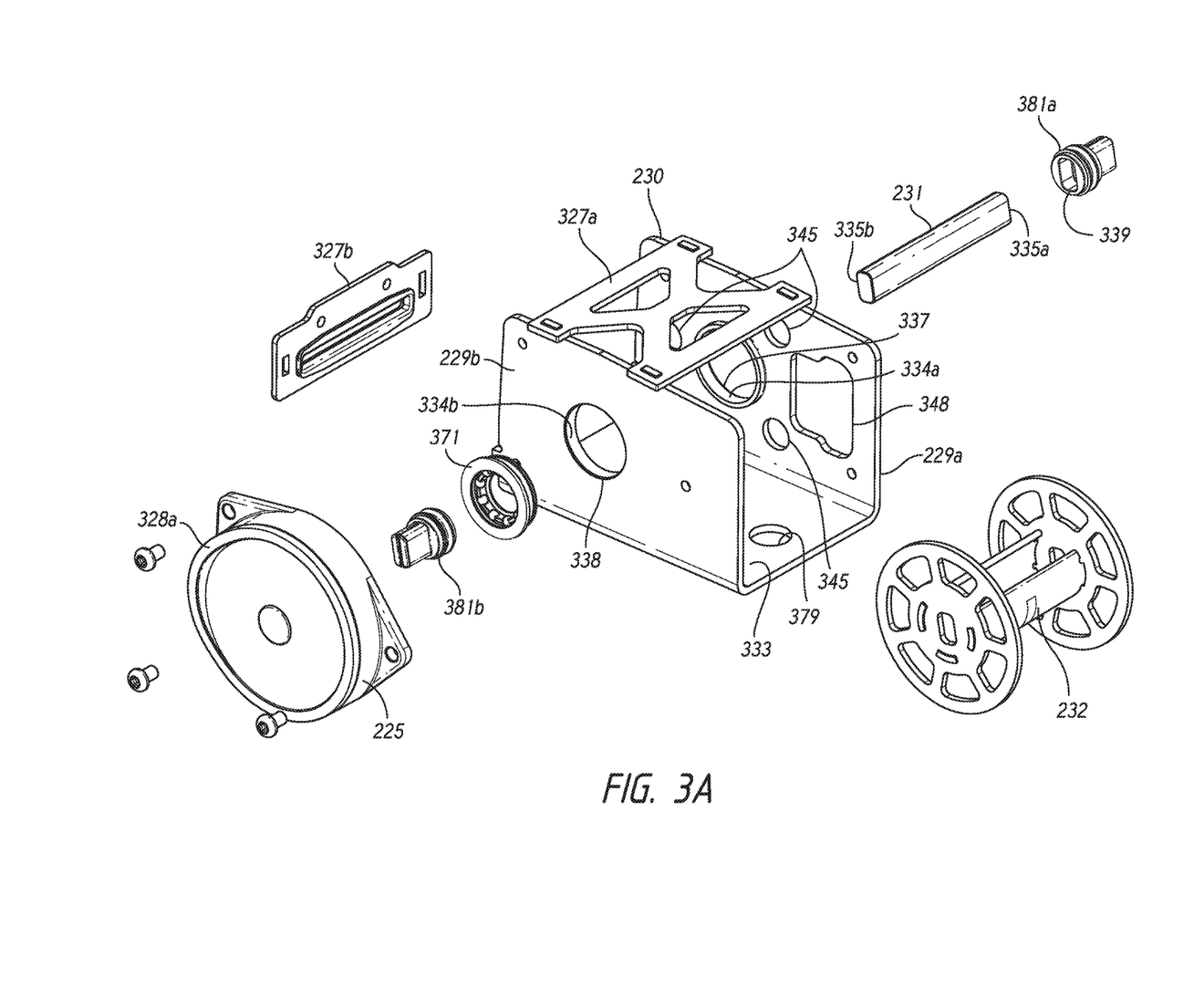
FIGS. 3A-3C are partially-exploded isometric views of portions of the web retractor of FIGS. 2A and 2B.

FIG. 3A is a partially-exploded, front isometric view of a portion of the web retractor 220 that includes the frame 230. The frame 230 includes a first opening 337 ("shaft opening 337") in the first sidewall 229a, and a second opening ("shaft opening 338") in the second sidewall 229b. The spool shaft 231 includes a first end portion 335a positioned proximate to the shaft opening 337, and a second end portion 335b positioned proximate to the shaft opening 338 in the opposing frame sidewall. The end portions 335a and 335b of the spool shaft 231 are fixedly coupled to first and second shaft couplers 381a and 381b (collectively "shaft couplers 381"), respectively. The first shaft coupler 381a includes an opening or blind hole 339 that receives the first end portion 335a of the spool shaft 231 to fix the first shaft coupler 381a thereto. In the illustrated embodiment, the blind hole 339 has an oval shape corresponding to the shape of the first end portion 335a. In other embodiments, the blind hole 339 and the first end portion 335a can have different shapes, such as a hexagonal shape, a triangular shape, or other shape configured to prevent the spool shaft 231 from rotating relative to the first shaft coupler 381a. The second shaft coupler 381b includes an opening (not shown) that is the same or similar to the blind hole 339 of the first shaft coupler 381a to fix the second shaft coupler 381b to the second end portion 335b.

In use, the first shaft coupler 381a forms part (e.g., an inner race) of a bearing assembly 370 that rotatably supports the first end portion 335a of the spool shaft 231 on a first bearing surface 334a in the shaft opening 337 on the locking side of the web retractor 220. The second shaft coupler 381b similarly forms part of a bearing assembly 371 that rotatably supports the second end portion 335b on a second bearing surface 334b in the shaft opening 338 on the drive side of the retractor. In various embodiments, the bearing assembly 370 can be the same as, or at least substantially similar in structure and function, as the bearing assembly 371. In some embodiments, one of the bearing assemblies 370 and 371 may be omitted from the web retractor 220 and replaced with a different bearing assembly, such as a bearing assembly in which the shaft coupler does not form a part of the bearing assembly. As described below, the first and second shaft couplers 381a and 381b are configured to operably engage the locking components and the drive components, respectively, of the corresponding locking and drive assemblies 223 and 225.

The retractor frame 230 includes an integral base 333 extending between the opposing frame sidewalls 229. The base 333 includes an aperture 379 configured to receive a bolt and/or other suitable fastener to fixedly attach the web retractor 220 to a seat base (e.g., the seat base 104 shown in FIG. 1A), a vehicle sidewall (e.g., as shown in FIG. 1B), and/or other portions of a vehicle. In other embodiments, the retractor frame 230 can be anchored to the vehicle using other suitable attachment means. The retractor frame 230 can be made from metal (e.g., stamp-formed from a metal sheet or plate, cast, forged, etc.), plastic, structural polymers, and/or other suitable materials known in the art. In various embodiments, the retractor frame 230 can include one or more reinforcement features, such as metal plates 327 (identified individually as a first plate 327a and a second plate 327b) spaced between the opposing sidewalls 229 of the retractor frame 230. In the illustrated embodiment, the second plate 327b can include an opening to receive a strap or web (e.g., the shoulder or lap webs 112 and 114 of FIGS. 1A and 1B).

Figure 3B:
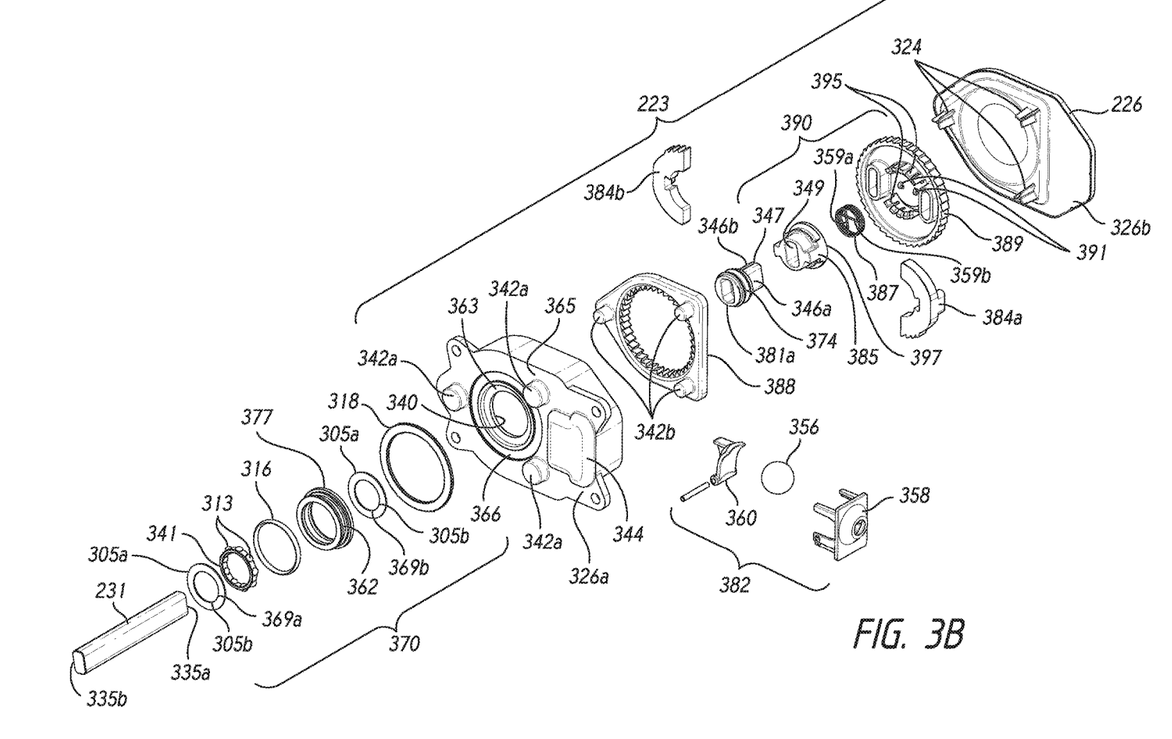
Figure 3C:
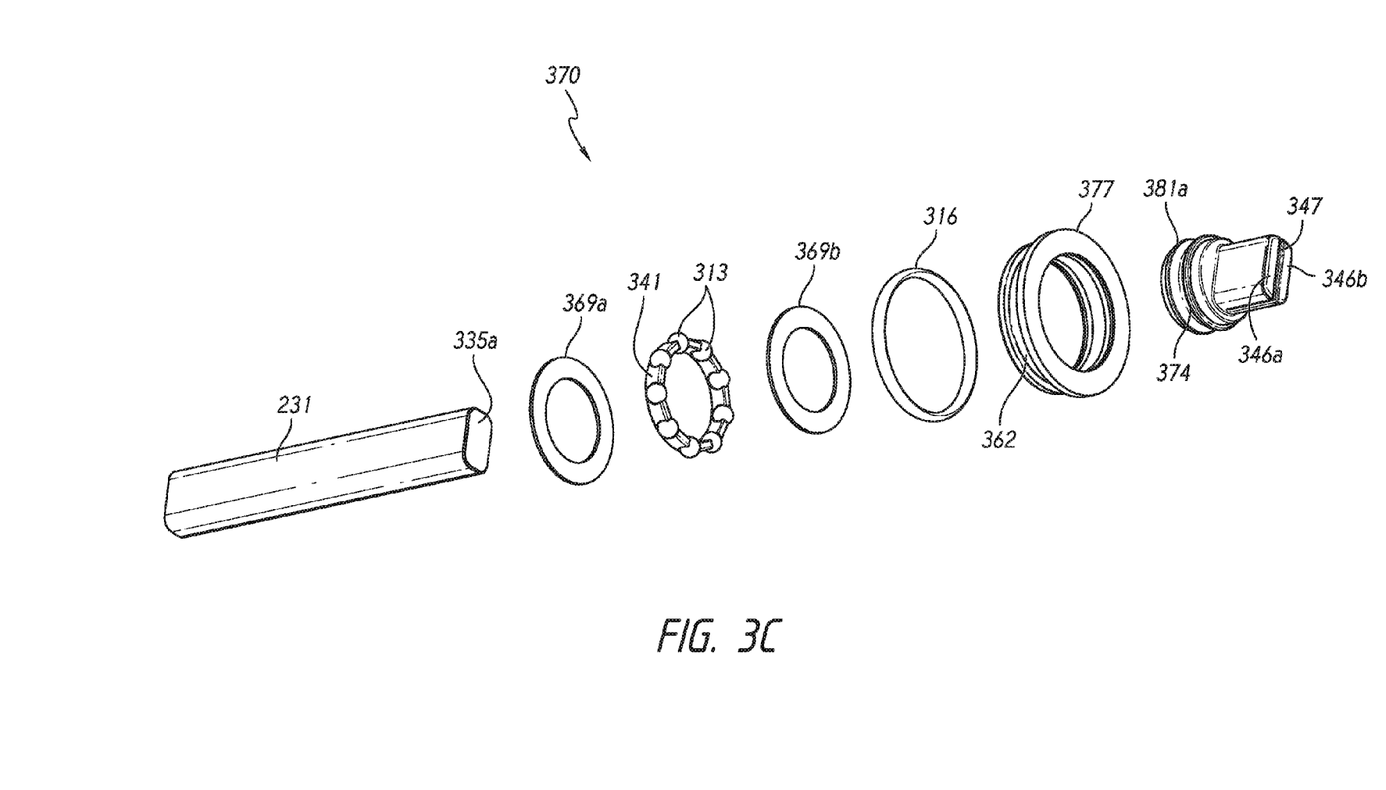

FIG. 3B is a partially-exploded, front isometric view of the locking assembly 223, and FIG. 3C is a partially-exploded, rear isometric view of the bearing assembly 370. Referring to FIG. 3B, the locking assembly 223 includes a lock ring structure 388 ("lock ring 388") fixedly installed in a first housing portion or inner cover 326a, a vehicle inertia sensor 382 seated within the inner cover 326a adjacent the lock ring 388, and a web inertia sensor 390 operably coupled to the first shaft coupler 381a. The web inertia sensor 390 includes a lock wheel 389 and a web-sense spring 387, such as a torsional spring, held to the lock wheel 389 by a retention member 385. The web-sense spring 387 has a first end portion 359a that inserts into a slot 347 in the first shaft coupler 381a, and a second end portion 359b that is secured to the lock wheel 389 by integral locking tabs or hooks 391 formed in the lock wheel 389. The lock wheel 389 also includes integral spring tabs 395 that attach the lock ring 389 to an outer lip 397 of the retention member 385. The retention member 385 is positioned between concentric locking features 384 (e.g., a pair of locking pawls; identified individually as a first locking pawl 384a and a second locking pawl 384b). The vehicle inertia sensor 382 includes a metal ball 356 (e.g., a steel ball) carried by a basket 358 and acting on a pawl lever 360 configured to engage the lock wheel 389 of the web inertia sensor 390.

Referring to FIGS. 3B and 3C together, the first shaft coupler 381a includes an inner bearing portion 374 and integral projections (e.g., a pair of D-shaped projections 346; identified individually as a first projection 346a and a second projection 346b) that project from the inner bearing portion 374. The integral projections 346 extend through an opening 349 (FIG. 3B) in the retention member 385 (FIG. 3B), and are spaced apart from one another to define the slot 347 that receives the web sense spring 387 (FIG. 3B). The bearing assembly 370 includes an outer bearing member 377 (e.g., an outer race) concentrically surrounding the inner bearing portion 374, and first and second seal members 369a and 369b (collectively "seal members 369") sealing the bearing assembly 370 at opposite sides. Each of the sealing members includes an outer edge 305a (FIG. 3B) that abuts an inner surface of the outer bearing member 377, and an inner edge 305b (FIG. 3B) that abuts an outer surface of the inner bearing portion 374 to seal the interior area of the bearing assembly 370. The outer bearing member 377 includes an outer recess or groove 362 configured to receive a seal member or O-ring 316 that is compressed against the first bearing surface 334a (FIG. 3A) in the shaft opening 337 in the first frame sidewall 229a. The O-ring 316 can include, for example, a gasket material formed from rubber, silicon, or other resiliently suitable materials (e.g., chemically and/or thermally resistant materials). The outer bearing member 377 is rotatably coupled to the inner bearing portion 374 of the first shaft coupler 381a via rotatable bearing elements (e.g., metal balls 313 or metal rollers) held within a retainer or cage structure 341.

Referring back to FIG. 3B, the locking components of the locking assembly 223 are accessible through an opening or aperture 340 formed in the inner cover 326a. The inner cover 326a has an outer surface 365 adjacent the first frame sidewall 229a (FIG. 3A). The outer surface 365 includes a first annular recess 363 that surrounds the aperture 340, and a second annular recess 366 that surrounds the first recess 363. A portion of the bearing assembly 370 is inserted into the annular first recess 363, and a sidewall seal 318 is inserted into the second annular recess 366. In various embodiments, the sidewall seal 318 can be an O-ring or gasket material that is similar to the material of the O-ring 316 of the bearing assembly 370. In other embodiments, the sidewall seal 318 and the O-ring 316 can be formed from different materials.

The inner cover 326a further includes a plurality of first locking features or protrusions 342a radially positioned around the aperture 340, and a protruding portion 344 defining an internal cavity in the inner cover 326a (not visible in FIG. 3B) that at least partially contains the vehicle inertia sensor 382. The protruding portion 344 inserts and snugly fits into a corresponding first opening 348 (FIG. 3A) in the first frame sidewall 229a (FIG. 3A), and the first protrusions 342a insert and snugly fit within corresponding second openings 345 (FIG. 3A) in the first frame sidewall 229a. The first protrusions 342a receives corresponding second locking features or protrusions 342b integrally formed in the lock ring 388. Each second protrusion 342b can snugly fit within a blind hole (not visible in FIG. 3B) formed within a corresponding one of the first protrusions 342a at the opposite side of the lock ring 38. The second protrusions 342b are positioned adjacent to support features or stand-offs 324 integrally formed in an outer housing portion or cover 326b of the locking assembly housing 226.

In operation, the protruding portion 344 and the first protrusions 342a engage the first sidewall 229a to resist torsional forces applied to the locking assembly 223 by the spool 232. The second protrusions 342b similarly engage the first protrusions 342a to further resist torsional forces. In some embodiments, the torque capability of the protruding portion 344 and/or the protrusions 342a and 342b can enable the locking assembly 223 to be attached to the retractor frame 230 with, e.g., smaller gauge, lighter-weight, or fewer fasteners that would otherwise be required, while still maintaining suitable resistance to large torsional forces applied to the spool assembly 232 (FIGS. 2A and 2B) when a vehicle occupant experiences an impact or rapid deceleration event of sufficient magnitude. In some embodiments, the inner cover 326a can include one or more additional protrusion portions or no protrusion portion and/or a different number of protrusions (e.g., 3, 6, 8, or more protrusions) or no protrusions that engage the retractor frame 230. Additionally, the stand-off structures 324 of the outer cover 326b can provide structural reinforcement and suitable clearance between the outer cover 326b and the lock wheel 389 and other components within the locking assembly housing 226.

Figure 3D:
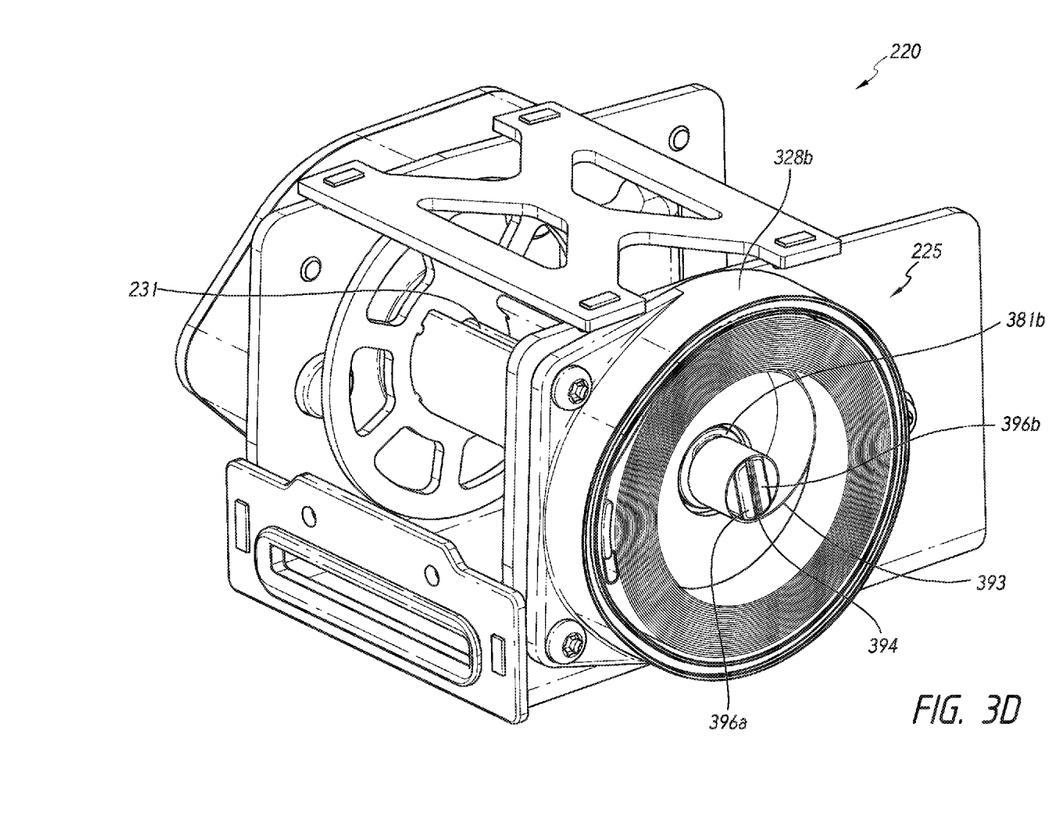
FIG. 3D is a rear isometric view of the web retractor of FIGS. 2A and 2B.

FIG. 3D is a rear isometric view of the web retractor 220 showing the drive assembly 225 with an outer housing portion or cover 328a (FIG. 3A) removed for purposes of illustration. The drive assembly is coupled to the spool shaft 231 via the second shaft coupler 381b. The second shaft coupler 381b includes an inner bearing portion (not shown) and integral projections 396 (identified individually as a first projection 396a and a second projection 396b) that define a slot 394 configured to receive an end portion of a driving spring 393, such as a torsional spring, held in a lower housing portion or cover 328b of the drive assembly 225. In operation, the driving spring 393 applies a torque to the second shaft coupler 381b, and hence the spool shaft 231. This, in turn, exerts a tension on the web during extension and drives web retraction. The driving spring 393 can be made from an elastic metal (e.g., hardened steel) and/or other suitable material that can store sufficient energy to spring-load the spool shaft 231.

Figure 4:
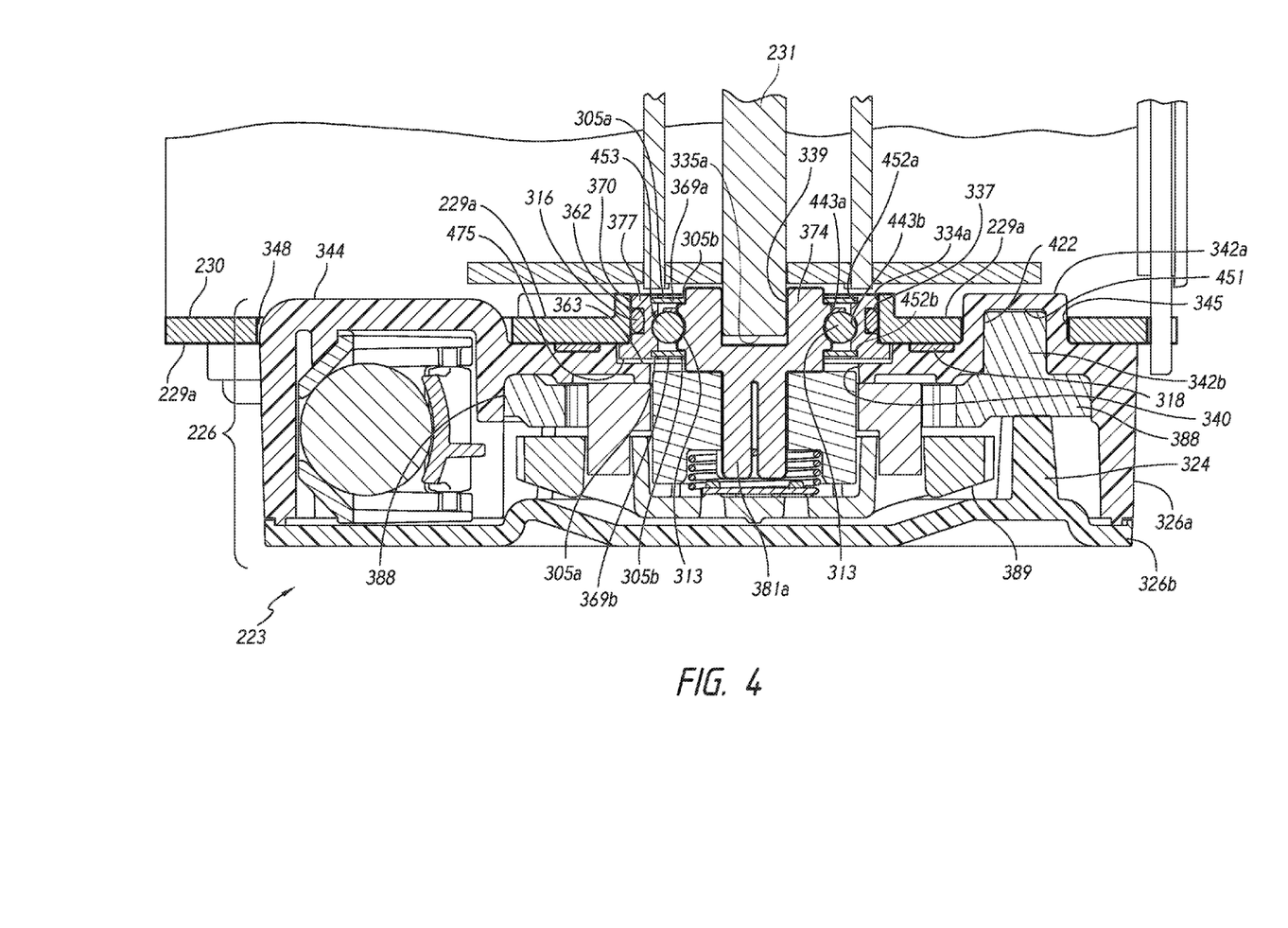
FIG. 4 is an enlarged cross-sectional view of the web retractor of FIGS. 2A and 2B taken substantially along line 4-4 of FIG. 2A.

FIG. 4 is an enlarged cross-sectional view of the web retractor 220 taken generally along line 4-4 of FIG. 2A and showing the first end portion 335a of the spool shaft 231 inserted into the blind hole 339 of the first shaft coupler 381a of the bearing assembly 370. The bearing assembly 370, in turn, can be inserted (e.g., press fit) into the shaft opening 337 in the first frame sidewall 229a. Each of the outer bearing member 377 and the inner bearing portion 374 includes an annular or circular surface (e.g., a race surface 443; identified individually as a first race surface 443a and a second race surface 443b) configured to engage the metal balls 313.

The bearing assembly 370 snugly holds the O-ring 316 in the outer groove 362 of the outer bearing member 377 and against the first bearing surface 334a in the shaft opening 337 of the first frame sidewall 229a. The outer bearing member 377 includes interior grooves 452 (identified individually as a first groove 452a and a second groove 452b) that receive the outer edges 305a of the corresponding seal members 369. The outer bearing member 377, the inner bearing portion 374, and the seal members 369 form an annular space 453 that contains the metal balls 313. In operation, the seal members 369, the O-ring 316, and the housing seal 318 can prevent or at least restrict the ingress of moisture, fluids, and other debris into the annular space 453 and into the interior area of the housing 226 of the locking assembly 223. For example, the blind hole 339 of the first shaft coupler 381a can seal an ingress path between the first shaft coupler 381 and the first end portion 335a of the spool shaft 231. In the illustrated embodiment, the outer bearing member 377 includes an extension portion or outer ridge 475 that inserts into the first annular recess 363 in the inner cover 326a of the locking assembly 223. The outer ridge 475 extends radially beyond the shaft opening 337 and over a peripheral portion of the first frame sidewall 229a to further seal the shaft opening 337 and seal, or at least substantially seal, an ingress path. In other embodiments, the bearing assembly 370 can be without a portion that extends into the first recess 363, and in some embodiments the first annular recess 363 can be omitted. Further, the sidewall seal 318 can seal, or at least substantially seal, an ingress path between the first frame sidewall 229a and the inner cover portion 326a.

As further shown in FIG. 4, the openings 345 and 348 in the frame 230 receive the first protrusions 342a and the protruding portion 344, respectively. Each of the first projections 342a includes a blind hole 451 in the inner cover 326a that receives a corresponding one of the second protrusions 342b of the lock ring 388. The inner and outer covers 326a and 326b can be formed from plastic (e.g., injection-molded plastic and/or structural polymers) and/or other suitable materials for housing the locking components of the locking assembly 223. In some embodiments, the outer cover 326b can be welded to the inner cover 326a using, e.g., laser, ultrasonic, hot-plate, or other suitable welding techniques (e.g., to hermetically seal the inner and outer covers 326a and 326b). In other embodiments, the inner and outer covers 326a and 326b can be attached together using fasteners, adhesives, or other suitable attachment techniques. In use, the covers 326a and 326b, the first bearing assembly 370, the O-ring 316, and the sidewall seal 318 shield the internal locking components and prevent fluids and other debris from entering the interior of the locking assembly 223 and interfering with the operation of the locking components within the assembly 223. The drive assembly housing 228 (FIG. 2B) can be made of materials and include seal members that are generally similar or identical to those of the locking assembly housing 226. Additionally, the inner and outer covers of the drive assembly 228 (FIGS. 2A and 2B) can be attached (e.g., welded together) in a manner similar to that used to attach the lower and outer covers 326a and 326b of the locking assembly housing 226.

Figure 5A:
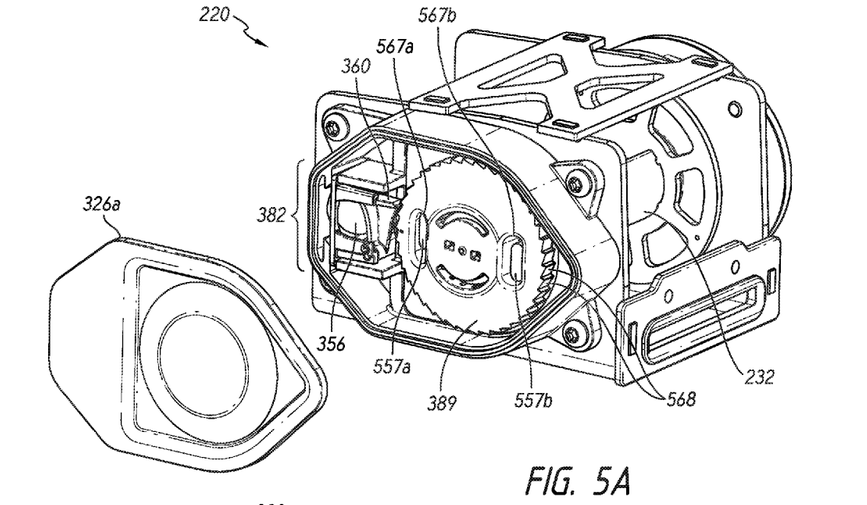
FIGS. 5A and 5B are partially exploded isometric views of the web retractor of FIGS. 2A and 2B showing locking components of the locking assembly in further detail.
Figure 5B:
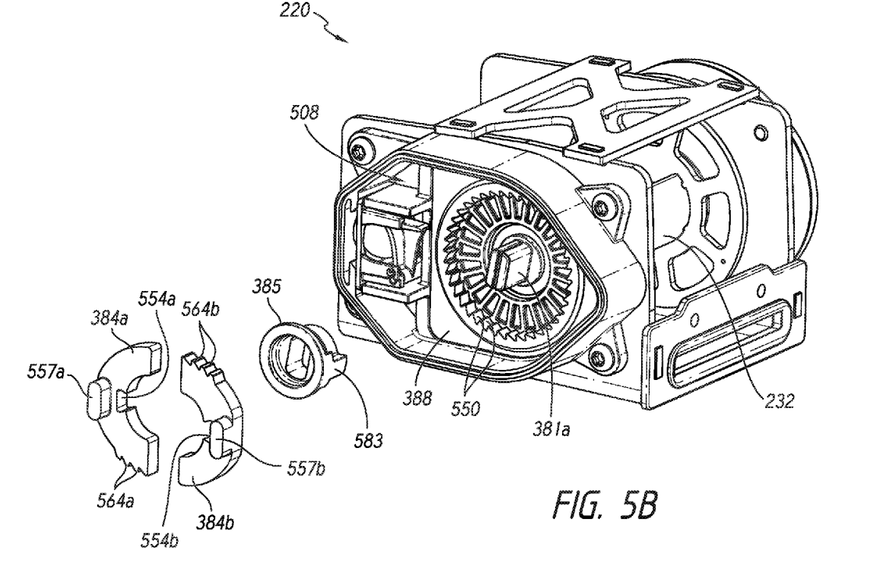

FIGS. 5A and 5B are partially-exploded, front isometric views of the web retractor 220 illustrating the vehicle inertia sensor 382, the lock ring 388, the locking pawls 384, and other components of the locking assembly 223 (FIGS. 2A and 2B) in further detail. Referring to FIGS. 5A and 5B together, each locking pawl 384 includes a projecting tab 557 (identified individually as a first projecting tab 557a and a second projecting tab 557b) that is slidably received in a corresponding opening 567 (identified individually as a first opening 567a and a second opening 567b) in the lock wheel 389. The lock wheel 389 includes a plurality of teeth 568 positioned along a peripheral surface of the lock wheel 389 and configured to engage the locking pawl 360 of the vehicle inertia sensor 382.

Referring to FIG. 5B, each locking pawl 384 further includes a guide feature 554 (identified individually as a first guide feature 554a and a second guide feature 554b) adjacent the corresponding projection tab 557, and a teeth portion 564 (identified individually as a first teeth portion 564a and a second teeth portion 564b) positioned along a peripheral edge of the pawl. Each guide feature 554 receives an integral engagement portion on the retention member 385. The pawl teeth 564 are configured to engage outer teeth 550 positioned along a peripheral surface of the lock ring 388. In the illustrated embodiment, the lock ring 388 is positioned within an inner cavity 508 of the inner cover 326a. In another embodiment, the lock ring 388 can be integrally formed with the inner cover 326a. In yet another embodiment, the lock ring 388 can be molded into the material (e.g., a structural polymer) of the inner cover 326a. In various embodiments in which the inner cover 326a is formed from a structural polymer, the lock ring 388 can engage the structural polymer, and the structural polymer, in turn, can engage the retractor frame 230 to resist torsional forces. The first shaft coupler 381a and the lock wheel 389 can be made from a suitable plastic (e.g., polyoxymethylene), metal, and/or other material that can withstand loads applied to the driving spring during retraction and extension of the web. In some embodiments, the locking pawls 384 and the lock ring 388 can be made from metal. In other embodiments, the locking pawls 384 and/or the lock ring 388 can be made from a rigid plastic with low moisture sensitivity, such as glass-filled polypropylene and/or other glass-filled plastic materials.

In some embodiments, the web inertia sensor 390 and the vehicle inertia sensor 382 can lock rotation of the spool 232 (FIGS. 2A and 2B) in a manner that is generally similar to a conventional locking assembly. The web inertia sensor 390 (FIG. 3B) can be activated when web extraction accelerates the rotational speed of the spool 232 (by, e.g., rapid pulling of the web) above a predetermined threshold controlled by the torsion in the web-sense spring 387 (FIG. 3B). When acceleration is below the threshold, the torsion applied to the locking pawls 384 forces the projecting tabs 557 toward one side of the corresponding openings 567 in the lock wheel 389. This, in turn, holds the locking pawl teeth 564 away from the outer teeth 550 of the lock ring 388 to allow the spool 232 to freely rotate. When acceleration exceeds the predetermined threshold, the locking pawls 384, due to their inertial mass, overcome the applied torsion, causing the locking pawls 384 to move outwardly in the openings 567. The openings 567 guide the projecting tabs 557 as the pawl teeth 564 move toward and into engagement with the outer teeth 550 of the lock ring 388, thereby preventing further extraction of the web.

The vehicle inertia sensor 382 can be activated when acceleration or deceleration above a threshold causes the metal ball 356 to push the pawl lever 360 into engagement with the outer teeth 568 of the lock wheel 389. For example, the vehicle inertia sensor 382 can be triggered during rapid decelerations, accelerations, and/or changes in orientation due to, e.g., an accident and/or the vehicle climbing or descending a sharp incline. The locking components of the locking assembly 223 can be actuated independently by either the vehicle inertia sensor 382, the web inertia sensor 390, or both.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

We claim:

1. A web retractor for use with an occupant restraint system in a vehicle, the web retractor comprising:
    a frame having a sidewall with a first opening;
    a locking assembly having a housing with a second opening, wherein the housing is attached to the sidewall of the frame with the second opening adjacent to the first opening;
    a spool shaft configured to carry a web wound thereon;
    a shaft coupler operably coupling the shaft to the locking assembly through the first and second openings; and
    at least one seal operably positioned in the first opening between the shaft coupler and the sidewall, wherein the shaft coupler is rotatably and sealably carried by the sidewall.

2. The web retractor of claim 1 wherein:
    the shaft coupler includes an inner bearing portion having a blind hole that extends at least partially through the first opening of the sidewall; and
    the shaft has an end portion that is inserted into the blind hole.

3. The web retractor of claim 1 wherein:
    the web retractor further includes an outer race of a bearing assembly;
    the outer race is seated at least in the first opening of the sidewall; and
    the shaft coupler forms an inner race of the bearing assembly.

4. The web retractor of claim 3 wherein the seal extends between the inner and outer races.

5. The web retractor of claim 3 wherein the outer race includes a recess adjacent the first opening and receiving the seal therebetween.

6. The web retractor of claim 1 wherein the shaft coupler includes a bearing portion that forms an inner race of a bearing assembly, and at least one integral projection projecting from the bearing portion and engaging a locking component of the locking assembly.

7. The web retractor of claim 6 wherein:
    the locking component includes a web-sense spring; and
    the at least one integral projection includes a first projection and second projection defining a slot configured to receive an end portion of the web-sense spring.

8. The web retractor of claim 1, further comprising:
    an outer race concentrically surrounding the shaft coupler and seated at least within the first opening; and
    a plurality of rotatable bearing elements operably held between the outer race and the shaft coupler.

9. The web retractor of claim 8 wherein:
    the locking assembly includes a recess concentrically surrounding the second opening; and
    the outer race includes an extension portion that extends into the recess and over a portion of the sidewall adjacent the first opening.

10. A sealed web retractor for use with a seat belt web, the web retractor comprising:
    a frame having first and second opposing sidewalls, wherein the first sidewall has a first opening and the second sidewall has a second opening;
    a locking assembly attached to the first sidewall adjacent the first opening;
    a spring drive assembly attached to the second sidewall adjacent the second opening;
    a web spool having a shaft operably coupled to the locking assembly and the spring drive assembly,
    at least one bearing assembly, the bearing assembly including—
        a shaft coupler fixedly coupled to an end portion of the spool shaft to operably couple the spool shaft to one of the locking assembly or the drive assembly,
        an outer bearing member fixedly disposed in one of the first opening or the second opening and spaced apart from the shaft coupler to define an annular space therebetween,
        a plurality of rotatable bearing elements operably disposed in the annular space between the outer bearing member and the shaft coupler, and
        a seal member operably disposed adjacent the bearing elements to seal the annular space between the outer bearing member and the shaft coupler.

11. The web retractor of claim 10 wherein:
    the shaft coupler includes an inner bearing portion and one or more integral projections projecting from the inner bearing portion; and
    the one or more projections are configured to operably engage one of (1) at least one locking component within the locking assembly and (2) at least one drive component within the spring drive assembly.

12. The web retractor of claim 11 wherein the at least one locking component includes a web-sense spring, and the at least one drive component includes a drive spring.

13. The web retractor of claim 11 wherein:
    the outer bearing member includes an interior groove facing the inner bearing portion of the shaft coupler; and
    the seal member is inserted into the interior groove and abuts the inner bearing portion of the shaft coupler.

14. The web retractor of claim 10 wherein:
    the seal member is a first seal member;
    the outer bearing member includes an outer recess facing the one of the first opening and the second opening; and
    the web retractor further comprises a third seal member inserted into the outer recess.

15. The web retractor of claim 10 wherein the outer bearing member includes an extension portion extending radially beyond the one of the first and second shaft openings.

16. The web retractor of claim 15 wherein:
the seal member is a first seal member;
the outer bearing member includes a recess adjacent the extension portion; and
the web retractor further comprises a second seal member inserted into the recess.

17. A sealed web retractor for retracting a web, the retractor comprising:
a frame having a first opening formed in a sidewall thereof;
a locking assembly having a housing with a second opening;
a spool shaft for carrying a web wound thereon;
a bearing assembly rotatably supporting an end portion of the spool shaft, the bearing assembly including—
an outer bearing member coupled to the sidewall in the first opening, and
a coupler fixedly coupled to the end portion of the spool shaft, wherein the coupler includes (1) an inner bearing portion rotatably coupled to the outer bearing member, and (2) means for operably engaging locking components though the second opening to releasably lock the spool shaft in response to rotation of the spool shaft above a threshold; and
means for preventing fluid to pass into the housing between the coupler and the outer bearing member.

18. The web retractor of claim 17 wherein the means for preventing fluid to pass into the housing between the coupler and the outer bearing member includes:
a first seal member between the outer bearing member and the inner bearing portion of the shaft coupler; and
a second seal member between the outer bearing member and a surface in the first opening.

19. The web retractor of claim 18 wherein the outer bearing member includes an extension portion adjacent the second seal member and projecting radially beyond the first opening.

20. The web retractor of claim 18 wherein the means for preventing fluid to pass into the housing between the coupler and the outer bearing member includes a third seal member (1) surrounding the second opening of the housing of the locking assembly and (2) positioned between the housing and the sidewall of the frame.

* * * * *